United States Patent [19]

Hoffmann

[11] Patent Number: 4,888,465

[45] Date of Patent: Dec. 19, 1989

[54] HOT BEVERAGE MACHINE WITH THICK FILM ELECTRIC HEATER

[75] Inventor: Erich Hoffmann, Bergisch-Gladbach, Fed. Rep. of Germany

[73] Assignee: Robert Krups Stiftung & Co. KG., Solingen, Fed. Rep. of Germany

[21] Appl. No.: 207,762

[22] Filed: Jun. 16, 1988

[30] Foreign Application Priority Data

Jul. 11, 1987 [DE] Fed. Rep. of Germany ....... 3723016

[51] Int. Cl.$^4$ ............................................. A47J 31/00
[52] U.S. Cl. ..................................... 219/301; 99/307; 219/338
[58] Field of Search ............................... 338/306, 314; 99/279–282, 288, 304–307; 219/543, 301, 302, 329, 334, 335, 338, 310, 311

[56] References Cited

U.S. PATENT DOCUMENTS

| | | |
|---|---|---|
| 3,916,366 | 10/1975 | Jefferson ............................. 338/306 |
| 4,546,697 | 10/1985 | Schaeffer ............................. 99/281 |
| 4,647,900 | 3/1987 | Schelhorn et al. ................... 338/314 |
| 4,741,259 | 5/1988 | Ogata et al. ......................... 99/307 |

FOREIGN PATENT DOCUMENTS 3122521 12/1982 Fed. Rep. of Germany ........ 99/280

*Primary Examiner*—A. D. Pellinen
*Assistant Examiner*—Geoffrey S. Evans
*Attorney, Agent, or Firm*—Peter K. Kontler

[57] ABSTRACT

A coffee or tea making machine wherein the housing has a container for a supply of water and supports a holder for tea leaves or comminuted coffee beans. A conduit connects the outlet of the container with the holder, and a portion of such conduit is constituted by an electric heater which has one or more thick film conductors in series with an on-off switch and a relay which regulates the flow of current from an energy source to the thick film conductor or conductors. Such conductor or conductors can be applied directly to an insulating carrier which can be made of a ceramic or plastic material and defines a portion of the path for the flow of water from the container to the holder. Alternatively, the carrier can be made of a metallic material, such as aluminum, and then supports one or more insulating covers at least one of which carries a thick film conductor. The conductor or conductors are applied in the form of a paste which is caused to dry on the insulating carrier or on the cover or covers.

20 Claims, 3 Drawing Sheets

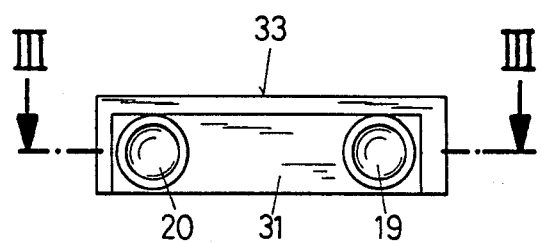
FIG. 2
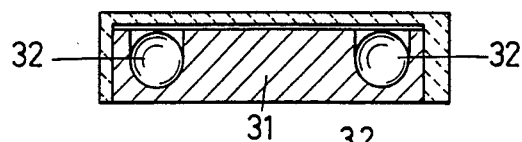
FIG. 5
FIG. 7
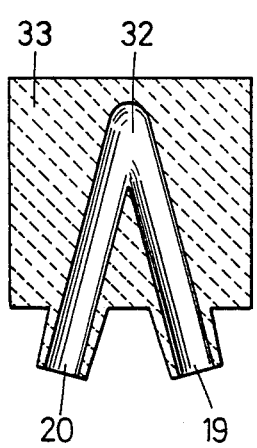
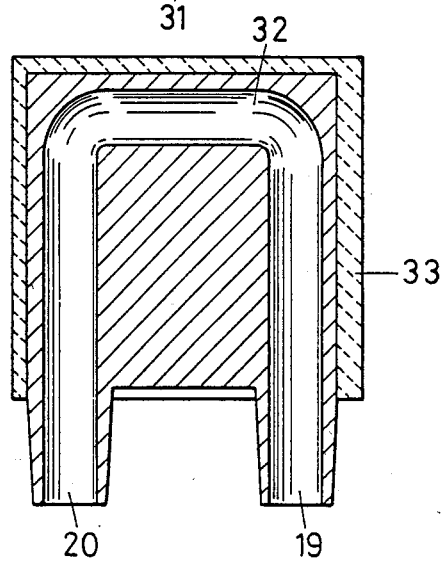
FIG. 3
FIG. 8
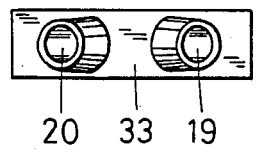
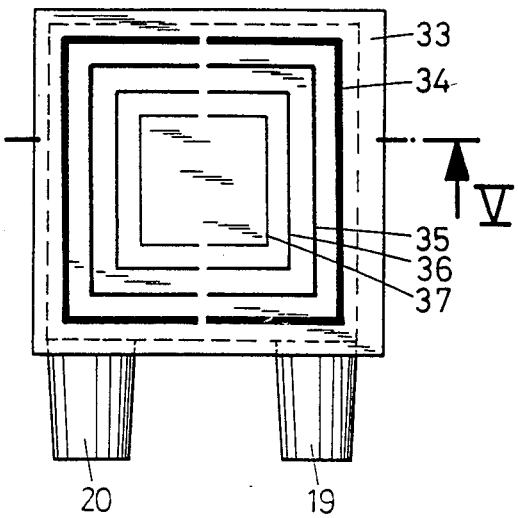
FIG. 4

HOT BEVERAGE MACHINE WITH THICK FILM ELECTRIC HEATER

CROSS-REFERENCE TO RELATED CASES

A machine for making coffee and other hot beverages which employs electric heaters with thick film conductors is disclosed in my commonly owned copending application Ser. No. 207,764 filed June 16, 1988.

A machine for making hot tea which employs an electric heater with one or more thick film conductors is disclosed in my commonly owned copending patent application Ser. No. 207,763 filed June 16, 1988.

My commonly owned copending patent application Ser. No. 056,852 filed June 1, 1987 by Erich Hoffmann (now U.S. Pat. No. 4,765,422 granted Aug. 23, 1988) discloses a bathroom scale with a strain gauge employing a resistor which is a thick film conductor.

My commonly owned copending patent application Ser. No. 056,855 filed June 1, 1987, now abandoned discloses a printed circuit with one or more thick film conductors for use in an electric hair dryer.

My commonly owned copending patent application Ser. No. 056,854 filed June 1, 1987 discloses a rotor for an electrical machine wherein the commutator comprises thick film conductors.

BACKGROUND OF THE INVENTION

The invention relates to machines for making hot beverages, such as coffee, tea and chocolate. More particularly, the invention relates to improvements in machines of the type wherein a stream of water or another liquid (such as milk) is caused to flow from a container in or on the housing of the machine, through an electric heater and into a holder for a supply of flavoring agent, such as comminuted coffee beans, tea leaves, chocolate powder or the like.

Machines of the above outlined character are known and are in extensive use. In many instances, the conduit means for conveying hot water or another liquid from the electric heater to the holder for a supply of flavoring agent comprises a riser which discharges hot water into the holder, and the latter has a sealable outlet at level above a support (such as a warming plate) for a coffee pot, a teapot or any other suitable vessel for heated beverages.

The electric heaters of presently known coffee making and like machines normally comprise a metallic tube which is mounted on a carrier and contains a heating spiral. The latter is normally embedded in a supply of magnesium oxide powder. The metallic tube is adjacent a conduit which conveys the liquid to be heated. A heater of the just outlined character normally comprises a substantially U-shaped metallic tube for the heating spiral and a substantially U-shaped conduit for the liquid. Cold liquid enters by way of one leg of the U-shaped conduit, and heated liquid leaves the heater by way of the other leg of such conduit.

A drawback of the just described electric heaters is that the rate of heat transfer between the metallic pipe and the liquid in the conduit is not very satisfactory. Moreover, such heaters generate noise and their initial cost is high. Still further, these heaters must be used jointly with auxiliary components such as thermostats and/or specially designed safety fuses. Certain electric heaters of the above outlined character further employ a diode, especially if the machine is to be converted from the making of a relatively small quantity of coffee or another beverage to the making of a larger quantity of such beverage or vice versa. The diode is used to conform the quantity of electrical energy which is supplied to the heating spiral to the selected quantity of the beverage. Such auxiliary components contribute significantly to the cost of the machine and render it prone to malfunction.

OBJECTS AND SUMMARY OF THE INVENTION

An object of the invention is to provide a novel and improved machine for making hot beverages which is simpler, less expensive and less prone to malfunction than a conventional machine.

Another object of the invention is to provide a novel and improved electric heater for use in a coffee making, a tea making or a like machine.

A further object of the invention is to provide an electric heater whose heating capacity is relatively small so that it can immediately react to changes of the quantity of liquid to be heated.

An additional object of the invention is to provide an electric heater which can be installed in certain existing machines as a superior substitute for heretofore known electric heaters.

Still another object of the invention is to provide an electric heater which need not employ a metallic pipe for a heating spiral and whose efficiency is superior to that of conventional heaters.

A further object of the invention is to provide a novel and improved carrier of electric conductors for use in the above outlined heater.

An additional object of the invention is to provide novel and improved electric conductor means for use in the above outlined electric heater.

The invention is embodied in a machine for making hot beverages (such as coffee, tea or chocolate) by contacting a heated liquid (such as water or milk) with a flavoring agent. The improved machine comprises a housing having a permanently installed or detachable container for a supply of the liquid, a holder which is supported by the housing and serves to contain a supply of flavoring agent (such as comminuted coffee beans, tea leaves or chocolate powder), and conduit means provided in the housing and defining a path for the flow of liquid from the container to the holder. The conduit means includes an electric heater which defines a portion of the path and includes at least one thick film conductor, switch means in series with the thick film conductor, and a relay or other suitable current regulating means in series with the thick film conductor. The heater can further comprise a carrier which defines the aforementioned portion of the path and has a plurality of surfaces. The at least one conductor includes a hardened paste-like conductive material which is applied (directly or indirectly) to at least one surface of the carrier. The current regulating means can be connected in series with the switch means; for example, one terminal of the at least one thick film conductor can be connected with the switch means and another terminal of the at least one conductor can be connected with the current regulating means. The conduit means can further comprise a riser which serves to convey heated liquid from the heater to the holder, i.e., into contact with the flavoring agent. A portion of the housing (such as a base or leg) can be disposed beneath the holder to support a coffee pot, a tea pot or another suitable vessel for the beverage. The holder has a sealable outlet which can dispense hot beverage into the vessel on the aforementioned portion of the housing.

The heater can comprise a metallic carrier (e.g., a block made of aluminum) which defines the aforementioned portion of the path and at least one cover of insulating material on the carrier to support one or more thick film conductors. The path portion which is defined by the carrier can be substantially U-shaped, and the carrier can be provided with an inlet for admission of liquid into and with an outlet for evacuation of heated liquid from the U-shaped portion of the path. The conduit means can further comprise a first portion which connects the inlet of the carrier with the container and a second portion which can include the aforementioned riser and serves to convey heated liquid from the outlet of the carrier to the holder. The cover or covers can contain a ceramic material, a plastic material or any other suitable insulating material. The arrangement is preferably such that a cover is provided on top of the carrier and has an upper side to which the thick film conductor or conductors are applied. The carrier can support a plurality of substantially plate-like covers each of which may but need not carry one or more thick film conductors. The covers can be applied to several mutually inclined and/or parallel surfaces of the carrier. The heater can comprise at least one thick film conductor for each cover.

Alternatively, the heater can comprise a one-piece carrier of ceramic, plastic or other insulating material which defines the aforementioned portion of the path and is directly in contact with one or more thick film conductors. The path portion which is defined by the insulating carrier can be substantially V-shaped. It is presently preferred to provide such insulating carrier with an inlet and an outlet for liquid in a first surface of the carrier and to cause the substantially V-shaped path portion to extend from the inlet, close to a second surface which is remote from the first surface, and thereupon to the outlet. This ensures that the conveyed liquid is in highly satisfactory heat exchanging contact with the carrier.

If the heater comprises two or more thick film conductors, the regulating means can be designed to selectively connect one, two or more conductors with a suitable energy source. Furthermore, at least one of the plural conductors can be thicker than at least one other conductor and/or at least one of the conductors can be longer than at least one other conductor.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an end elevational view of the electric heater as seen from the left-hand side of FIG. 1;

FIG. 3 is a sectional view as seen in the direction of arrows from the line III—III of FIG. 2;

FIG. 4 is a plan view of the heater which is shown in FIG. 2;

FIG. 5 is a sectional view as seen in the direction of arrows from the line V—V of FIG. 4;

FIG. 7 is a sectional view, similar to that of FIG. 3, of a third heater; and

FIG. 8 is an end elevational view as seen from the underside of FIG. 7.

DESCRIPTION OF PREFERRED EMBODIMENTS

Figure 1:
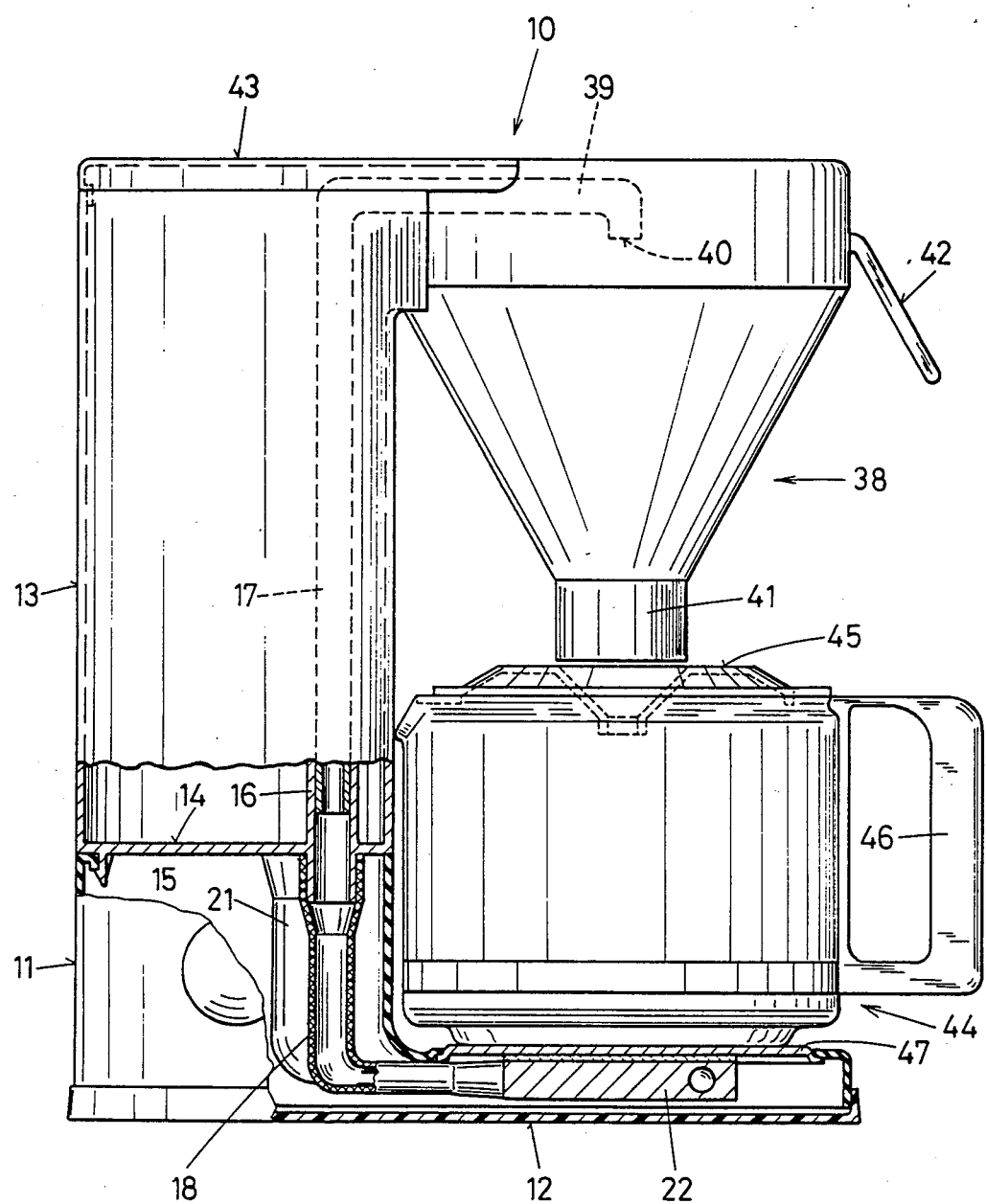
FIG. 1 is an elevational view of a machine which embodies one form of the invention, with portions of the housing, liquid container and conduit means broken away.

The drawing shows only those parts of the improved machine which are necessary for full understanding of the invention. For example, the drawing does not show a cable for connection of the heater to a source of electrical energy and/or all of the conductors between such cable and the heating element. All parts which are not shown in the drawing but are necessary for proper operation of the machine can be identical with or analogous to the corresponding parts of conventional machines, for example, those known as Coffee Maker No. 152, Coffee Maker No. 154, Coffee/Tea Maker No. 164 and Coffee/Tea Maker No. 165 (all produced by the assignee of the present application).

For example, the machine 10 which is shown in FIGS. 1 to 5 can be used to make hot coffee and includes a substantially L-shaped housing 11 which is made of an electrically insulating material. The portion 12 of the housing 11 constitutes a substantially horizontal leg which is hollow and supports a warming plate 47 for a vessel 44, such as a coffee pot. The underside of the housing portion 12 can come to rest directly on a table, on a counter or on any other suitable support. The upright portion or leg of the housing 11 supports or is integral with a container 13 for a supply of water, milk or another liquid which is to be heated prior to being brought into contact with a flavoring agent, such as comminuted coffee beans. In the embodiment which is shown in FIG. 1, the container 13 is a discrete part which has a bottom wall 14 provided with at least one but preferably two or more coupling elements 15 engageable with complementary coupling elements of the upright portion of the housing 11.

The bottom wall 14 of the container 13 is provided with two nipples 16 (only one can be seen in FIG. 1) one of which serves to admit relatively cold liquid into a pipe 21 leading to an electric heater 22 and the other of which receives heated liquid from a pipe 18 and conveys such liquid to the lower end portion of a riser 17 which is or can be installed in the container 13. The upper end portion of the riser 17 delivers heated liquid into a horizontal pipe 39 having an outlet 40 for admission of heated liquid into the interior of a holder 38 for a supply of flavoring agent. For example, the holder 38 can be designed to receive a conical filter paper (not shown) for a supply of comminuted coffee beans. The sealable outlet 41 of the filter holder 38 is disposed at a level above the cover 45 of the vessel 44 resting on the warming plate 47. The holder 38 has a handle 42, and the vessel 44 has a handle 46. The character 43 denotes a closure or lid which can be removed or lifted in order to afford access to the interior of the container 13, i.e., to replenish the supply of liquid therein.

The vessel 44 can be made of a light-transmitting (preferably transparent) material, and its cover 45 has a centrally located opening for admission of hot beverage when such beverage is dispensed by way of the outlet 41 of the holder 38. The latter can be designed to accommodate a larger or a smaller supply of flavoring agent, depending on the desired number of cups of hot beverage. The warming plate 47 for the bottom wall of the vessel 44 is preferably heated by the electric heater 22. A suitable seal, such as a silicon seal, can be interposed between the warming plate 47 and the portion or leg 12 of the housing 11.

The manner in which the holder 38 can be converted to accept larger or smaller quantities of a flavoring agent is disclosed, for example, in commonly owned copending patent application Ser. No. 184,682, now U.S. Pat. No. 4,843,955 filed Apr. 22, 1988 by Stefan Henn and Klaus Beumer for "Machine for brewing coffee and other hot beverages" and in commonly owned copending patent application Ser. No 184,683, now U.S. Pat. No. 4,790,240 filed Apr. 22, 1988 by Stefan Henn and Rudolf Maass for "Machine for brewing hot beverages".

The electric heater 22 in the hollow portion or leg 12 of the housing 11 has a U-shaped passage or channel 32 which constitutes a portion of an elongated path for the flow of liquid from the container 13, through the heater 22 and into the holder 38. The path is defined by a composite conduit which includes the nipples 16 in the bottom wall 14 of the container 13, the pipes 21 and 18, the riser 17, the pipe 39 and the electric heater 22. At least one of the pipes 18, 21 can be made of a flexible elastic material so as to be capable of sealingly engaging the respective nipples 16 of the bottom wall 14 as well as the inlet 20 and outlet 19 of a substantially block-shaped metallic carrier 31 forming part of the heater 22. The direction of flow of a stream of liquid through the carrier 31 of the electric heater 22 can be best seen in FIG. 6 which shows that the pipe 21 admits liquid to the inlet 20 in the direction of arrow A and that the outlet 19 of the carrier 31 admits heated liquid to the pipe 18 which conveys such liquid in the direction of arrow B, namely into the riser 17.

The heater 22 in the portion 12 of the housing 11 is or can be constructed in a manner as shown in FIGS. 2–5. The aforementioned carrier 31 is a substantially flat block-shaped metallic body having an upper side or surface facing the warming plate 47 and four vertical sides or surfaces. The inlet 20 and outlet 19 extend from one of the vertical sides. The other three vertical sides are overlapped by the respective portions of a cover 33 which also overlies the upper side of the carrier 31. The cover 33 is made of an insulating material (such as a ceramic or a plastic substance) and carries a plurality of thick film conductors 34, 35, 36 and 37. The U-shaped passage or channel 32 of the carrier 31 has a circular cross-sectional outline and extends close to the four portions of the cover 31 and hence close to the conductors 34-37 at the outer side of the cover. The carrier 31 can be made of aluminum and its inlet 20 and outlet 19 face rearwardly, namely toward the container 13. The cover 33 can be bonded (adhesively secured) to the carrier 31.

FIG. 4 shows four pairs of thick film conductors 34-37 at the upper side of the cover 31, i.e., adjacent the underside of the warming plate 47. However, it is equally within the purview of the invention to provide at least one thick film conductor on at least one additional portion of the cover 31, i.e., on a portion which extends substantially vertically to overlie one of the vertical sides of the carrier 31. The conductors 34 to 37 form two groups, and the conductors of one group are mirror images of the conductors of the other group. The arrangement may be such that the conductors of one group are connected to an energy source for the purpose of brewing of a relatively small quantity of coffee, and the conductors of both groups are connected to the energy source when the holder 38 contains a relatively large supply of a flavoring agent. However, it is equally possible to connect one, two or three conductors of each group to the energy source for the brewing of a relatively small quantity of coffee, and to connect all conductors to the energy source for the purpose of brewing, for example, eight, ten or twelve cups. The two groups are separated from each other by a relatively narrow gap which extends vertically in the view of FIG. 4. Each of the eight thick film conductors 34-37 of FIG. 4 is U-shaped, the conductors 34 surround the conductors 35-37, the conductors 35 surround the conductors 36-37, and the conductors 36 surround the conductors 37. The length of the conductors 34 exceeds the length of the conductors 35-37, and the length of the conductors 36 is less than that of the conductors 35 but exceeds the length of the conductors 37. The width of the conductors 34 exceeds that of the conductors 35, the width of the conductors 35 exceeds that of the conductors 36, and the width of the conductors 36 exceeds that of the conductors 37. The resistance of the conductors is inversely proportional to their width (it being assumed that the height of all conductors is the same).

FIGS. 7 and 8 show a modified electric heater having a block-shaped carrier 33 of insulating material. This carrier has four vertical sides or surfaces one of which is provided with an inlet 20 for cold liquid and an outlet 19 for heated liquid. The passage or channel 32 in the carrier 33 of FIGS. 7 and 8 is substantially V-shaped and extends from the inlet 20 to the vertical surface opposite the inlet 20 and outlet 19, and thereupon to the outlet 19. At least one side, e.g., the upper side, of the carrier 33 of FIGS. 7 and 9 is provided with one or more thick film conductors (not specifically shown) which may but need not be distributed in a manner as shown in FIG. 4. For example, the carrier 33 of FIGS. 7 and 8 can support one or more substantially circular, oval or like thick film conductors (this also applies for the electric heater 22 of FIGS. 2–5). By way of example, the carrier 33 of FIGS. 7 and 8 can be made of a suitable ceramic material which is an electrical insulator. The V-shaped passage or channel 32 has a substantially or exactly circular cross-sectional outline; however, it is equally possible to provide the carrier 31 of FIGS. 2–5 or the carrier 33 of FIGS. 7–8 with a passage 32 having an oval or polygonal cross-sectional outline.

The V-shaped passage or channel 32 can be replaced with a composite passage including two bores or holes which are inclined relative to each other and communicate with one another close to one vertical side of the carrier 33. It will be noted that the inlet 20 and outlet 19 extend from the major portion of the carrier 33.

Figure 6:
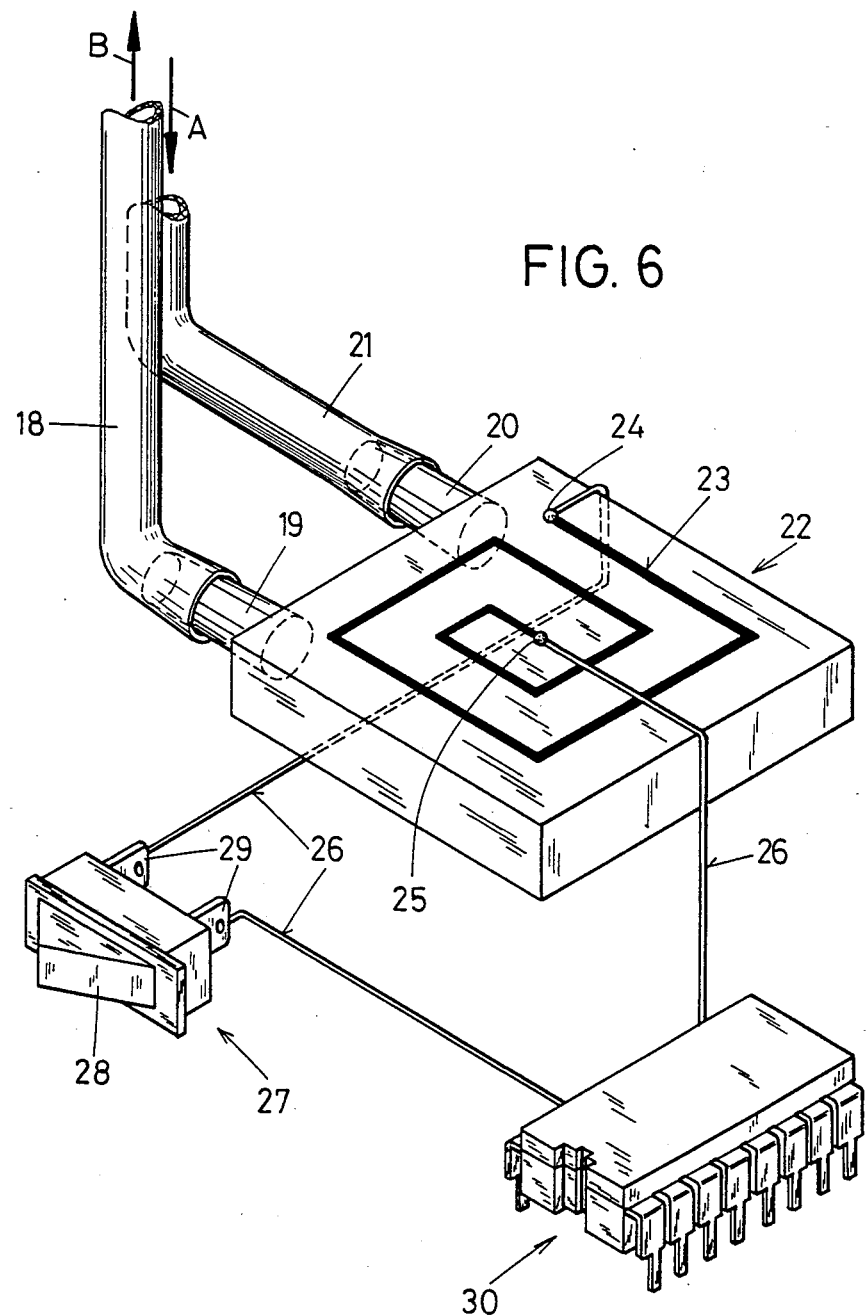
FIG. 6 is an enlarged perspective view of a second heater.

FIG. 6 shows that the heater 22 comprises a block-shaped carrier which resembles the carrier 33 of FIGS. 7–8 except that its inlet 20 is parallel with the outlet 19. The upper side of the carrier 33 is provided with a single thick film conductor 23 which resembles a spiral. One end portion 24 of this conductor is connected with one terminal 29 of an electric switch 27 by a line 26, and another line 26 connects the other terminal 29 of the switch 27 with the corresponding terminal of a relay 30. A third line 26 connects the other end portion 25 of the thick film conductor 23 with another terminal of the relay 30. The manner in which the relay 30 is connected with an energy source is not shown in FIG. 6. The terminals 29 of the switch 27 (which is a commercially available component with a pivotable actuator 28) can be soldered to the respective lines 26. The switch 27 is an on-off switch. The relay 30 can be of the type known as CMOS which is distributed by Motorola.

The relay 30 can be designed to regulate the flow of current through the thick film conductor 23 in the following way: When the switch 27 is actuated at 28 to complete the circuit of the heater 22, the output is 500 watts for a period of 8 minutes. The relay 30 thereupon automatically reduces the power to 30 watts which suffices to ensure that the warming plate 47 can maintain the beverage in the vessel 44 at an optimum temperature. The heater 22 can be automatically disconnected from the energy source by way of the relay 30 (e.g., after the elapse of a selected further interval of time), or such disconnection can be effected by way of the switch 27 which is in series with the conductor 23 and with the relay 30.

The thick film conductors 34–37 can be applied in the form of a paste which is thereupon caused or permitted to set. A heater employing one or more thick film conductors is simpler, less expensive and less prone to malfunction than conventional electric heaters of the type presently used in coffee making and like machines for the making of hot beverages. Thus, the improved heater (especially that shown in FIG. 6 or in FIGS. 7 and 8) comprises a small number of parts each of which can be mass produced at a low cost. The improved heater is a self-regulating PTC (positive temperature control) heater which can dispense with thermostats, safety fuses and/or diodes because the functions of such auxiliary components are performed by the aforediscussed elements of the heater.

The manner of making a paste which is to form one or more thick film conductors is well known in the art, the same as the manner of applying such paste to a support. Reference may be had, for example, to published European patent application Ser. No. 0 158 779 which fully discloses suitable materials for the making of paste as well as methods of applying paste to supports for thick film conductors.

The improved machine is susceptible of many additional modifications without departing from the spirit of the invention. For example, the shape, size and/or other features of the heater 22 can be changed in order to conform the heating capacity and/or the dimensions of the heater to requirements in a particular housing and for a particular machine. The passage or channel 32 in the carrier 31 or 33 can assume a shape which deviates from that shown in FIGS. 3 or 7, and the passage or channel can have a cross-sectional outline which is not circular or which is circular in part only. Still further, the number, width, length and/or configuration of thick film conductors can be varied practically at will. The relay 30 can perform other functions in addition to that of regulating the supply of electrical energy to the thick film conductor or conductors. The improved heater can be used in many types of coffee makers, tea makers or other machines for the making of hot beverages.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Machine for making hot beverages by contacting a heated liquid with a flavoring agent, such as tea or coffee, comprising a housing having a container for a supply of liquid; a holder supported by said housing and arranged to contain a supply of flavoring agent; and conduit means provided in said housing and defining a path for the flow of liquid from said container to said holder, said conduit means including an electric heater which defines a portion of said path and includes at least one thick film conductor, switch means in series with said conductor, and current regulating means in series with said conductor.

2. The machine of claim 1, wherein said heater further comprises a carrier which defines said portion of said path and has a plurality of surfaces, said at least one conductor including a hardened paste-like conductive material adjacent at least one of said surfaces.

3. The machine of claim 1, wherein said current regulating means comprises a relay in series with said switch means, said at least one thick film conductor having a first terminal connected with said switch means and a second terminal connected with said relay.

4. The machine of claim 1, wherein said conduit means further includes a riser between said heater and said holder to convey heated liquid into contact with the flavoring agent.

5. The machine of claim 1, wherein said housing includes a portion disposed beneath said holder and arranged to support a vessel for the beverage, said holder having outlet means for dispensing beverage into the vessel on said portion of said housing.

6. The machine of claim 1, wherein said heater further comprises a metallic carrier which defines said portion of said path and at least one cover of insulating material provided on said carrier and supporting said at least one thick film conductor.

7. The machine of claim 6, wherein said portion of said path is substantially U-shaped.

8. The machine of claim 6, wherein said carrier has an inlet for liquid and an outlet for liquid, said conduit means further comprising a liquid-supplying portion connecting said container with said inlet and a liquid-evacuating portion connecting said outlet with said holder.

9. The machine of claim 8 wherein said cover contains a ceramic material.

10. The machine of claim 8, wherein said cover contains a plastic material.

11. The machine of claim 8, wherein said cover has an upper side and said at least one conductor is applied to said upper side.

12. The machine of claim 6, wherein said heater comprises a plurality of substantially plate-like covers on said carrier.

13. The machine of claim 12, wherein said carrier has a plurality of mutually inclined surfaces and each of said covers overlies a different surface of said carrier.

14. The machine of claim 13, wherein said heater comprises a plurality of thick film conductors, at least one for each of said covers.

15. The machine of claim 1, wherein said heater further comprises a one-piece carrier of insulating material which defines said portion of said path, said at least one thick film conductor being provided directly on said carrier.

16. The machine of claim 14, wherein said portion of said path is substantially V-shaped.

17. The machine of claim 16, wherein said carrier has spaced apart first and second external surfaces, said first surface having an inlet for admission of liquid into said portion of said path and an outlet for evacuation of liquid from said portion of said path, said portion of said path extending from said inlet close to said second surface and thence to said outlet.

18. The machine of claim 1, wherein said heater comprises at least two thick film conductors and said regulating means includes means for selectively connecting said conductors with an energy source.

19. The machine of claim 18, wherein one of said conductors is thicker than another of said conductors.

20. The machine of claim 18, wherein one of said conductors is longer than another of said conductors.

* * * * *